United States Patent
Huberman et al.

(10) Patent No.: US 12,317,159 B2
(45) Date of Patent: May 27, 2025

(54) METHOD AND SYSTEM FOR CALIBRATION OF A SPACE IN AN INDOOR AREA

(71) Applicants: Sean Huberman, Guelph (CA); Ahmed Mahmood, Milton (CA)

(72) Inventors: Sean Huberman, Guelph (CA); Ahmed Mahmood, Milton (CA)

(73) Assignee: MAPSTED CORP., Oakville (CA)

( * ) Notice: Subject to any disclaimer, the term of this patent is extended or adjusted under 35 U.S.C. 154(b) by 653 days.

(21) Appl. No.: 17/590,794

(22) Filed: Feb. 1, 2022

(65) Prior Publication Data

US 2023/0247397 A1    Aug. 3, 2023

(51) Int. Cl.
*H04W 4/33* (2018.01)
*H04W 4/021* (2018.01)
(Continued)

(52) U.S. Cl.
CPC ............ *H04W 4/33* (2018.02); *H04W 4/021* (2013.01); *H04W 4/024* (2018.02); *H04W 4/38* (2018.02)

(58) Field of Classification Search
CPC ....... H04W 4/33; H04W 4/021; H04W 4/024; H04W 4/38; H04W 4/029; H04W 4/80; H04W 4/023; H04W 64/00; H04W 4/027; H04W 4/025; H04W 4/026; H04W 84/12; H04W 64/003; H04W 4/35; H04W 64/006; H04W 16/20; H04W 88/02; H04W 16/18; H04W 84/005; H04W 4/08; H04W 40/20; H04W 12/63; H04W 36/322; H04W 12/64; H04W 8/005; H04W 28/0236; H04W 36/008375; H04W 28/0226; H04W 40/18; H04W 40/026; H04W 16/225; H04W 36/324; H04W 36/326; G01C 21/383; G01C 21/387; G01C 21/206; G01C 21/20; G01C 21/30; G01C 21/3841; G01C 21/3848; G01C 21/3602; G01C 21/34; G01C 21/3407; G01C 21/1656; G01C 21/005; G01C 21/32; G01C 21/3415; G01C 21/3461; G01C 21/1652; G01C 21/3815; G01C 21/3617; G01C 21/3644; G01C 21/3492; G01C 21/3623; G01C 21/3667;
(Continued)

(56) References Cited

U.S. PATENT DOCUMENTS 9,906,914 B2 *   2/2018   Nagpal ................. H04W 4/33
10,165,422 B2 * 12/2018   Huberman ........... H04W 4/024
(Continued)

FOREIGN PATENT DOCUMENTS

WO   WO-2022042655 A1 *   3/2022

*Primary Examiner* — Alison Slater
*Assistant Examiner* — Jing Gao (57) ABSTRACT

A method and a device for performing automated calibration are described. In an example, sensorial data gathered for a space to be mapped in an indoor area is obtained from one or more data recording devices. From the sensorial data, a plurality of trajectories are derived which indicate movement of the one or more data recording devices in the space. Based on the plurality of trajectories, a structural map representing a plurality of map constraints of the space is created. Further, from the sensorial data, calibration information associated with a series of locations in the space is extracted and used along with the structural map to generate a fingerprint map of the space.

20 Claims, 3 Drawing Sheets

(51) Int. Cl.
*H04W 4/024* (2018.01)
*H04W 4/38* (2018.01)

(58) Field of Classification Search
CPC ............ G01C 21/3867; G01C 21/3881; G01C 21/3804; G01C 21/3863; G01C 5/06; G01C 21/38; G01C 21/10; G01C 21/3859; G01C 19/00; G01C 21/3655; G01S 5/02526; G01S 17/89; G01S 17/86; G01S 19/13; G01S 13/867; G01S 19/42; G01S 19/14; G01S 5/0027; G01S 13/89; G01S 5/14; G01S 7/4808; G01S 7/497; G01S 5/02524; G01S 17/58; G01S 19/51; G01S 5/0284; G01S 15/89; G01S 7/4815; G01S 13/888; G01S 19/393; G01S 5/0036; G01S 2205/02; G01S 5/02522; G01S 7/412; G01S 19/52; G01S 5/012; G01S 19/396; G01S 19/53; G01S 5/02525; G01S 5/021; G01S 5/015; G01S 17/875; G01S 7/40; G01S 5/011; G01S 5/02; G01S 5/0295; G01S 5/163; G01S 19/23; G01S 7/52079

See application file for complete search history.

(56) References Cited

U.S. PATENT DOCUMENTS

| | | | | |
|---|---|---|---|---|
| 2015/0204676 A1* | 7/2015 | Zhang | ................... | G01S 5/0294 |
| | | | | 701/410 |
| 2017/0332203 A1* | 11/2017 | Nagpal | ................ | H04W 4/029 |
| 2023/0358546 A1* | 11/2023 | Broadway | ............ | G01C 21/005 |

* cited by examiner

```
OBTAINING, FROM ONE OR MORE DATA RECORDING DEVICES, SENSORIAL
DATA GATHERED FOR A SPACE TO BE MAPPED IN AN INDOOR AREA
310
```

↓

```
DERIVING A PLURALITY OF TRAJECTORIES FROM THE SENSORIAL DATA, THE
PLURALITY OF TRAJECTORIES INDICATING MOVEMENT OF THE ONE OR MORE
DATA RECORDING DEVICES IN THE SPACE
320
```

↓

```
CREATING, BASED ON THE PLURALITY OF TRAJECTORIES, A STRUCTURAL
MAP REPRESENTING A PLURALITY OF MAP CONSTRAINTS OF THE SPACE
330
```

↓

```
EXTRACT, FROM THE SENSORIAL DATA, CALIBRATION INFORMATION
ASSOCIATED WITH A SERIES OF LOCATIONS IN THE SPACE
340
```

↓

```
GENERATE, BASED ON THE CALIBRATION INFORMATION AND THE
STRUCTURAL MAP, A FINGERPRINT MAP OF THE SPACE FOR LOCALIZATION
INSIDE THE SPACE
350
```

FIG. 3

METHOD AND SYSTEM FOR CALIBRATION OF A SPACE IN AN INDOOR AREA

TECHNICAL FIELD

The disclosure herein relates to calibration of a space in an indoor area for localization.

BACKGROUND

Location-based services are rapidly expanding as a ubiquitous service proposition. Outdoor location technologies are mainly based on GPS (Global Positioning System) technologies. At the same time, users of mobile devices have started to increasingly use and depend on indoor positioning and navigation applications and features. Particularly, indoor positioning and navigation of a mobile device carried or worn by a user can be difficult to achieve using satellite-based navigation systems, such as GPS, because the satellite-based navigation technology generally relies on the line-of-sight between the mobile device and the satellite. Accordingly, when the connection between the two becomes unavailable, or is only sporadically available, such as within enclosed, or partially enclosed, urban infrastructure and buildings, including hospitals, shopping malls, airports, university campuses and industrial warehouses, the positioning and navigational capability of the satellite-based navigation system becomes unreliable. In turn, indoor navigation and positioning solutions may rely on various sensors including accelerometers, gyroscopes, and magnetometers that may be commonly included in mobile phones and other computing devices, in conjunction with acquired wireless communication signal data to localize the mobile device. Thus, effectiveness of the indoor navigation and positioning solution is directly dependent on the quality of data, sensor or signal, and the manner of utilization of data for localization.

DETAILED DESCRIPTION

Among other benefits and technical effects, embodiments provided herein provide for efficiently and effectively calibrating a space in an indoor area. According to an aspect, the present subject matter involves passively recording and gathering sensorial data from one or more data recording devices, when the data recording device is inside the space to be mapped in the indoor area. The space may be a portion or whole of an indoor venue or area, such as a shopping mall, an airport, a warehouse, a university, or any at least partially enclosed building. The sensorial data, so recorded, is then used for performing a simultaneous localization and mapping of the one or more data recording devices inside the space. In other words, the sensorial data is used for creating a rendition of the space to be mapped and the position of the data recording device in that space is tracked simultaneously. Therefore, according to one of the many aspects, the subject matter provides for indiscriminate collection of crowdsourced sensorial data from recording devices in indoor areas for crowdsourced calibration of the space inside the indoor area.

Generally, large spaces in indoor areas, such as shopping malls, airports, parking garages, and warehouses, that attract significant user traffic also seek to host a wide set of services that may be of interest to a user. Such services may often be specifically curated for a user based directly on a location of the mobile device of the user. For instance, an effective indoor location-based services (ILBS) system is able to generate suggestions of services and locations to the user by initiating a quick search in the vicinity of a user's location indicated by the user's mobile device. In few other instances, the ILBS systems may further allow a user to search for services or amenities and pin them as potential points-of-interest (POIs). At the same time, the ILBS systems may even offer efficient routing or navigation, coupled with user-friendly navigation, to reach a user-selected destination. Therefore, such indoor-location based services, given their application, form an obvious integration option for indoor positioning systems (IPSs) that seek to accurately localize or locate mobile devices in such spaces in indoor areas. In other words, a natural application of IPSs lies in offering indoor location-based services.

In addition, recent technological advancements which allow the universally available smart mobile devices packing a variety of sensors for gathering data that is usable for positioning, has extended the reach of IPS as well as ILBS. Typically, the IPS uses spatial data generated by such mobile devices in the indoor location to execute efficient and effective localization. The spatial data can be linked to entities in a floor plan, and the entities are, in turn, georeferenced, thereby facilitating localization.

In view of the enormous amount of spatial data that must be parsed by the IPS, the manner in which the spatial data is representative of the space in an indoor area and the ease of access and use of the spatial data is of particular relevance to the IPSs. Both, the representation of the space in an indoor area by the spatial data as well as the ease of access of the spatial data, may be governed by the technique of spatial indexing implemented by the IPS. In turn, therefore, the spatial indexing may have a direct bearing on the effectiveness and the efficiency of the IPS, which may be of particular relevance if the IPS is to offer time-sensitive services, such as navigation.

Conventionally, the space in an indoor area is represented as a connected network of linearly positioned dots along walking paths that may be traversed and are indicative of the possible locations of the mobile device in the space in an indoor area. In such a manner of representation of the space in an indoor area by the corresponding spatial data and the indexing thereof, the localization capability may be limited and the localization may always be a tradeoff between efficiency/speed and accuracy. For instance, for an accurate measurement, a large region of the space in an indoor area may have to be considered to increase the probability of locating the mobile device therein, which can involve considerably large amount of spatial data to be accessed and processed leading to a slow rate of localization and, therefore, ineffectiveness in providing the indoor location-based services.

In addition, the IPSs require some form of system calibration prior to going live for localization. The most typical type of calibration for localization is fingerprinting. In order to ensure sufficiently high accuracy of an indoor positioning or navigation solution, many individual fingerprint measurements must be taken at various locations within an area during calibration and mapping process to create a fingerprint repository which is represented as a fingerprint map. Particularly, in order to build the fingerprint repository, reference data is collected at known locations using various data sources and data points, including Wi-Fi signal strength, Bluetooth Low Energy (BLE) signal strength, Global Positioning System (GPS) availability, and magnetic field strength measurement, or a combination thereof.

The data collection is, usually, done by a user with a data collection device by physically visiting specific locations in the space in an indoor area to collect the reference data therefrom. The user is, typically, provided with a digitized floor plan of the space that can be used as a guide for collecting the data in various locations in the space. Each such collection or recording of data may typically take at least several minutes at each location or position and such calibration process, therefore, constitutes a highly labor- and time-intensive process, forming an expensive limiting barrier to deployment and scalability of indoor positioning/navigation solutions. Additionally, for the user operating the data collection device, the act of standing at each location and waiting for data collection to take place can be extremely boring and mentally taxing, not to mention inefficient and even ineffective in certain cases. At the same time, a digitized floor plan of the space has to available ahead of time, further limiting the usability of such techniques in calibrating the indoor areas.

Examples of the present subject matter are described herein which seek to address, inter alia, the above outlined deficiencies. The present subject matter, according to an aspect, discloses a manner of automated calibration of a space in an indoor area by crowdsourcing the information that is needed for calibrating the space. In effect, according to an example, the space can be calibrated for achieving localization of various devices in the space, but without prior knowledge of the geometry or layout or any structural elements or features of the space. In other words, the techniques envisage the generation of a structural map as well as a fingerprint map of the space for which the layout or the geometry is unknown, based on the calibration. In order to build the structural map as well as the fingerprint map (also referred to as a fingerprint repository), spatial data recorded by one or more data recording devices is obtained and then processed to determine map constraints, for instance, various physical or structural elements in the space, and to identify and map a fingerprint signatures for various locations in the space.

In operation, sensorial data gathered by the data recording devices in the space to be mapped in the indoor area is obtained, for example, at a server which is to perform the calibration. In an example, the data recording device can be, for instance, a mobile phone or other portable device having a plurality of sensors including inertial sensors and signal sensors. For instance, inertial sensors may include accelerometer, gyroscope, barometer, and other sensors having magnetic field sensing functionality and/or environmental pressure sensing functionality. Similarly, in said example, the signal sensors may include sensors capable of detecting and measuring Bluetooth, Wi-Fi, RFID, and GPS signals. The sensorial data is also interchangeably referred to as spatial data hereinafter.

From the gathered sensorial data, a plurality of trajectories, such as complete trajectories or trajectory segments, are derived which indicate movement of the data recording devices in the space. As mentioned previously, the data recording devices are triggered to automatically commence gathering of the sensorial data in the space, based on a location of the data recording device in relation to the space. For instance, when the data recording device is determined to be in the indoor area of a venue for which the calibration is to be done, then the data recording device may be triggered to passively continue to record spatial data as long as the data recording device is inside the space. According to an example, the transition of the data recording device from an outdoor area to the indoor area can be determined using either a satellite-based navigation system, such as a global positioning system (GPS), or a cellular signal-based locating system or a combination thereof, which can determine the location of the data recording device in real-time. In said example, as soon as the data recording device is determined to have exit the indoor area of the venue and is outside the venue, then the data gathering may be paused or terminated altogether. In another example, if the location of the data recording device, determined, for instance, based on the GPS, indicates that it has transitioned from outdoor area to indoor area, but of a venue for which the calibration is not to be performed, then the data recording device may not be triggered for recording the spatial or sensorial data.

In one example, the trajectory derivation is an iterative process which involves determining trajectories using sensorial data and then refining those trajectories for an accurate assessment and correct calibration. Accordingly, for refining the trajectories, multiple anchor points are identified inside the space. In one case, the trajectories already derived from the sensorial data or the sensorial data itself can be used to identify the anchor points. For instance, each anchor point can indicate a transition site, hereinafter referred to as site, in the space at which either a transition in an elevation inside the space takes place or a transition between the indoor area and an outdoor area takes place. In other words, the anchor points, in said example, can be the site in the indoor space at which either the data recording device enters or exits the space, i.e., it's a doorway to the space, or a site at which the data recording device can transition the floor, in case the venue is a multi-floor building. Therefore, when the sensorial data, for instance, barometric data, gyroscopic data or accelerometer data, indicates that the data recording device has made a transition in its elevation, the point of transition can be identified as an anchor point. Similarly, in another case, when, based on GPS data, the point is determined at which the data recording device transitions between the outdoor area and the indoor area, that point can be considered another anchor point.

Further, in said example, the trajectories and the sensorial data, as explained previously, may be obtained from multiple data recording devices and, therefore, for each location or region of the space, multiple different trajectories, for instance, due to variations in the sensors in each data recording device, may be obtained. Accordingly, in the manner described above, based on the trajectories, a set of concentrated anchor points can be estimated in vicinity of one location inside the space. For instance, multiple anchor points in each other's vicinity may be identified at which the data recording device changes elevation, i.e., a general region or location may be identified which may have an escalator, an elevator, and/or a staircase. In this location, each trajectory of each data recording device may show a spatially different anchor point that indicates transition, even though all such different anchor points concentrated in this location may pertain to the same physical feature, such as the staircase. In such a case, the concentrated anchor points can be fused to estimate a single anchor point at that location inside the space. In one example, the fusing of the plurality of concentrated anchor points to estimate the anchor point can be performed using a machine-learning based clustering technique, such as k-means clustering technique and the like.

According to an aspect, such a machine learning clustering technique may be particularly useful in estimating the anchor points per location. In certain cases, in contrast to the previous example, multiple anchor points in the general region may surround the location but all such points of transition may or may not belong to the same actual point of transition or physical feature. For instance, in case an elevator and a staircase which are in close proximity inside the space may cause the data recording devices to show the anchor points to be concentrated in the same general region, even though the trajectories may pertain to two different types of points of transition. In such a case, the machine clustering techniques can, with a fair degree of accuracy, segregate the concentrated anchor points into two different clusters, such that, ultimately, two anchor points are identified at that location pertaining to the two different physical features in the space.

Therefore, once the anchor points have been identified with sufficient accuracy, the trajectories previously determined based on the sensorial data can be refined. According to an aspect, for refining the trajectories, a set of relevant trajectories connecting the anchor points are identified from amongst the trajectories, previously identified. This set of relevant trajectories, in one example, is selected from amongst the entire collection of trajectories, based on a confidence score of each trajectory. In said example, the confidence score of each trajectory can determined based on various parameters, such as a theoretical best fit between the anchor points that the trajectory connects, a similarity of the trajectory with a majority proportion amongst the trajectories, and may even be selected based on an auxiliary corroborating technique.

Once the trajectories have been identified and refined, using the trajectories, a structural map of the space can be created which represents various map constraints of the space. As an example, the map constraints can include the physical elements or entities in the space and can be one or more accessible zones in the space, one or more inaccessible zones in the space, a doorway of the space, and points of transition of elevation, i.e., elevators, escalators, or staircase, inside the space. For instance, the accessible zones can be identified as a pedestrian area and can be a pathway or an open passageway area, such as a lobby area. Further, the pathway can be identified as narrow pathways or fairly broad passageways, depending on the derived trajectories. Similarly, in said example, the non-accessible zones can be identified as a wall or a floor opening.

In one example, geometry-based zone detection techniques can be applied on the trajectories to identify the map constraints based on the trajectories. In said example, the geometry-based zone detection technique may be based on various general behavioral patterns of users. In another example, the geometry-based zone detection technique can identify that the convergence of trajectories at a point and divergence from that point may indicate that the point is a doorway connecting two regions in the space.

In addition, from the sensorial data, calibration information associated with a series of locations in the space can be extracted and used along with the structural map to generate the fingerprint map or the fingerprint repository of the space. For instance, the calibration information can include signature of the sensorial data per location in the space and which can be used to individually identify each location inside the space. In an example, the fingerprint map can indicate variation of sensorial data on the structural map, i.e., in the space, and can be usable for localization or positioning as well as navigation inside the space.

Also provided herein is a method and a server computing system including a processor and a memory storing a set of computer instructions. In the server computing system, the instructions are executable in the processor to perform calibration in the manner described above to localize devices.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame. In other examples, other forms of coordinates, such as spherical coordinates or polar coordinates may be used for spatially indicating the locations, as envisaged in the present subject matter.

One or more embodiments described herein provide that methods, techniques, and actions performed by a computing device, such as a server, are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable mobile devices, and tablet mobile devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage mobile devices, such as hard drives on personal computers or servers. Other examples of computer storage mediums include portable memory storage units, flash memory (such as carried on smartphones, multifunctional mobile devices or tablets), and magnetic memory. Computers, terminals, network enabled mobile devices (e.g., mobile devices, such as cell phones) are all examples of machines and mobile devices that utilize processors, memory, and instructions stored on computer-readable mediums. Additionally, embodiments may be implemented in the form of computer-programs, or a computer usable carrier medium capable of carrying such a program.

System Description

Figure 1:
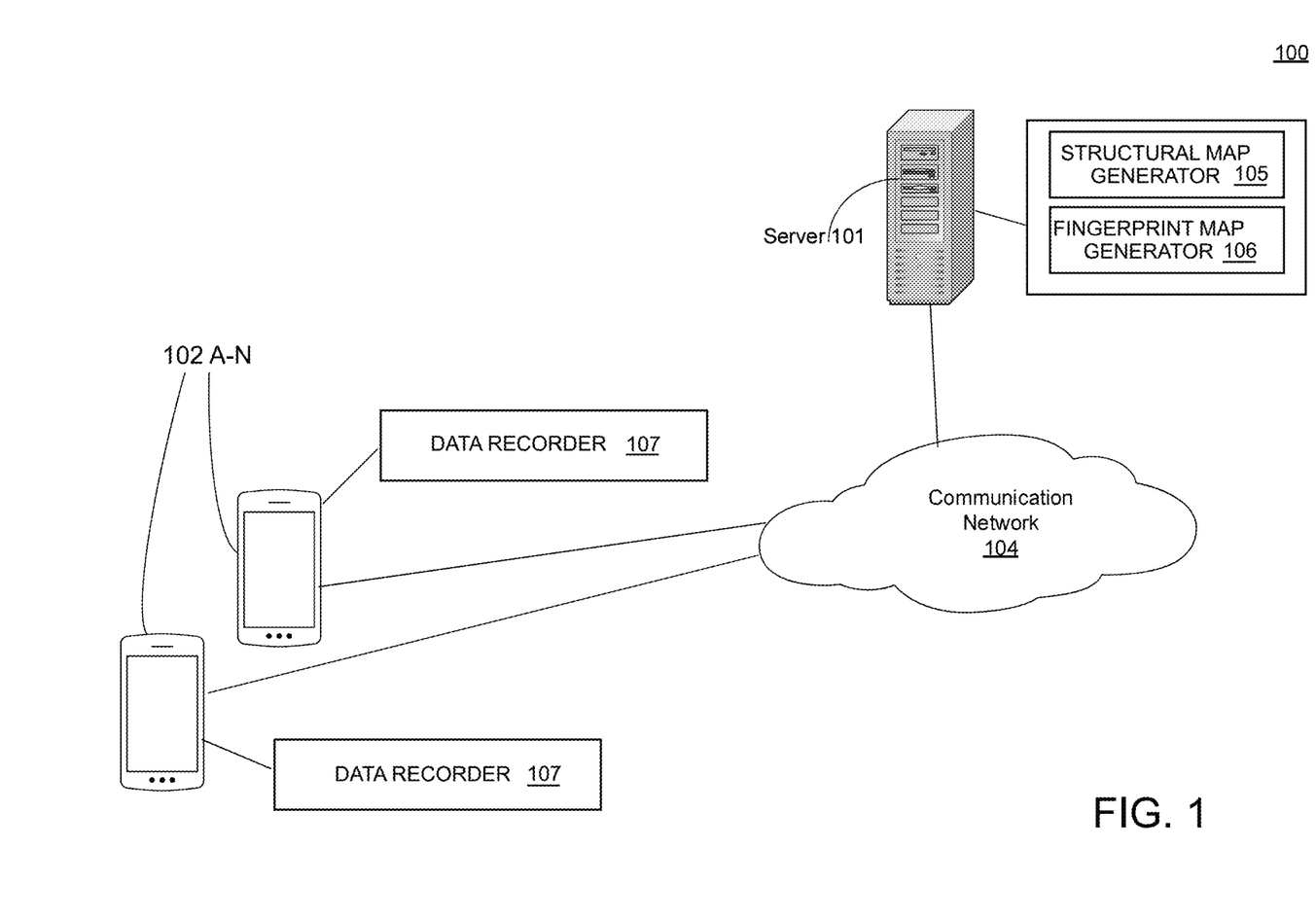
FIG. 1 illustrates, as an example, a system for automated calibration of a space in an indoor area.

FIG. 1 illustrates, in an example embodiment, a system 100 for automated calibration, for example, for generating a fingerprint map for a space in an indoor area, by acquiring spatial/sensorial data. The system includes a server 101, having a structural map generator 105 and a fingerprint map generator 106, and is communicatively connected via communication network 104 to a plurality of data recording devices 102A-N, referred to herein, collectively, as data recording devices 102 and, individually, as the data recording device 102. Each data recording device 102 includes a data recorder 107, which in one embodiment, may be included in a calibration software application downloaded and installed in each individual data recording device 102. According to an aspect, the system 100 is capable of indiscriminate collection of crowdsourced sensorial data from the data recording devices 102 in indoor areas for automated, crowdsourced calibration of the space.

As used herein, the term data recording devices 102 refers to any singular mobile device among data recording devices 102. In one embodiment, data recording devices 102 may correspond to, for example, a cellular communication device (e.g., smartphone, tablet, etc.) that is capable of telephony, messaging, and/or data computing services. In variations, data recording devices 102 can correspond to, for example, a tablet or a wearable computing device. According to an aspect, the data recording device 102 can be any portable device having a plurality of sensors including inertial sensors and signal sensors. For instance, inertial sensors may include accelerometer, gyroscope, barometer, and other sensors having magnetic field sensing functionality and/or environmental pressure sensing functionality. Similarly, in said example, the signal sensors may include sensors capable of detecting and measuring Bluetooth, Wi-Fi, RFID, and GPS signals.

In operation, according to an aspect, the server 101 can trigger the data recording devices 102 to passively record and gather sensorial data when the data recording devices are determined to be in proximity of or inside the space to be mapped in the indoor area. The space may be a portion or whole of an indoor venue or area, such as a shopping mall, an airport, a warehouse, a university, or any at least partially enclosed building. The server 101 can use the sensorial data, so recorded, for creating a rendition of the space and then position the data recording device 102 in that space. The server 101 can simultaneously performing a simultaneous localization and mapping of the data recording devices 102 inside the space. In other words, the server 101 can perform automated calibration of the space by crowdsourcing the information from the variety of data recording devices 102 that is needed for calibrating the space. In effect, according to an example, the space can be calibrated for achieving localization of various devices in the space, but without prior knowledge of the geometry or layout or any structural elements or features of the space. In other words, the techniques envisage the generation of a structural map as well as a fingerprint map of the space for which the layout or the geometry is unknown, based on the calibration. In order to build the structural map as well as the fingerprint map (also referred to as a fingerprint repository), spatial data recorded by one or more data recording devices is obtained and then processed to determine map constraints, for instance, various physical or structural elements in the space, and to identify and map a fingerprint signatures for various locations in the space.

In the examples discussed above as well as henceforth, the sensorial data or spatial data, as referred above, that is acquired by the data recording device 102 for the purposes of automated calibration of the space in the indoor area can include, for instance, the wireless signal data generated by the data recording device 102. The wireless signal data including signal strength and connectivity, such as Wi-Fi received signal strength and Bluetooth received signal strength connectivity and measurements, inertial data, barometric data, magnetic data including field strength and direction data, and other device data that may be gathered at positions along a trajectory of motion and used as input parameters for joint fusion with fingerprint location data. In some embodiments, the joint fusion, also referred to as data fusion herein, can be performed using a Bayesian filter, a Kalman filter, a Rodriguez filter, or any suitable method of jointly fusing input data to determine a position of the mobile device, or localize the mobile device, based on the data fusion.

In embodiments, the sensorial data, as recorded by the data recording devices 102 and then obtained or acquired by the server 101, in addition to above, may include respective time-stamps, whereby the orientation, the magnetic field strength and direction, the received wireless signal strength, the barometric pressure, and the position data can be time-correlated for any given position along a trajectory or trajectory segment of the mobile devices, in accordance with the respective time-stamps. Additionally, when the sampling times and sampling rates applied to particular ones of device sensors are different, the signal and sensor information as measured may be aggregated and fused, for example, time-averaged across particular periods of time, with the aggregated and fused value being used to represent the signal information at any given instance of time within that particular period of time in which the signal information is aggregated and fused.

Figure 2:
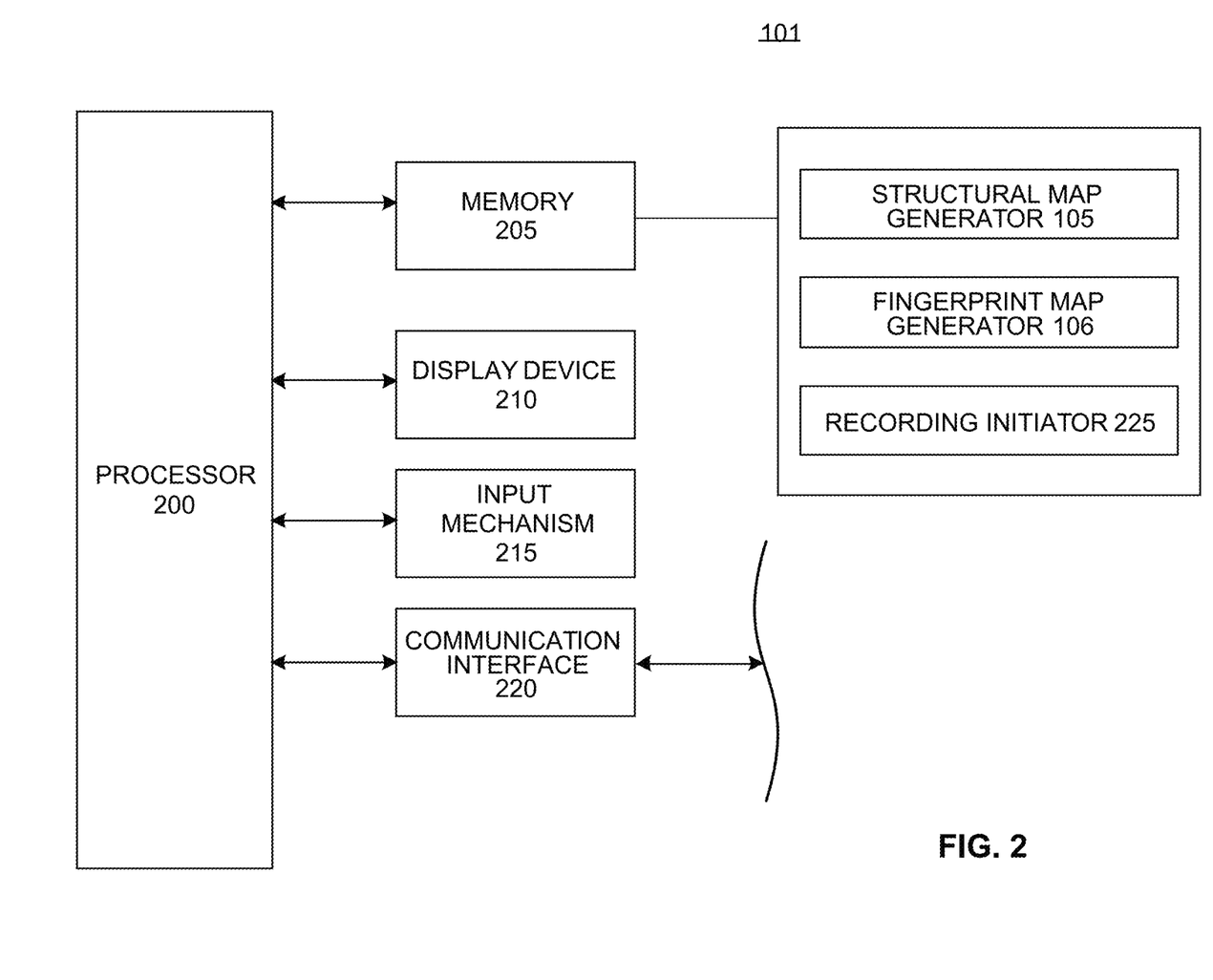
FIG. 2 illustrates, as an example, an architecture of a computer server for automated calibration of the space.

FIG. 2 illustrates an example architecture of a server computing device for targeted calibration of the space in an indoor area. The server 101, in an embodiment architecture, may be implemented on one or more server devices, and includes processor 200, memory 205 which may include a read-only memory (ROM) as well as a random-access memory (RAM) or other dynamic storage device, display device 210, input mechanisms 215 and communication interface 220 for communicative coupling to communication network 104. Processor 200 is configured with software and/or other logic (such as from a trusted GPS logic module) to perform one or more processes, steps and other functions described with implementations, such as described by FIGS. 1 through 4 herein. Processor 200 may process information and instructions stored in memory 205, such as provided by a random-access memory (RAM) or other dynamic storage device, for storing information and instructions which are executable by processor 200. Memory 205 also may be used for storing temporary variables or other intermediate information during execution of instructions to be executed by processor 200. Memory 205 may also include the ROM or other static storage device for storing static information and instructions for processor 200; a storage device, such as a magnetic disk or optical disk, may be provided for storing information and instructions. Communication interface 220 enables server 101 to communicate with one or more communication networks 104 (e.g., cellular network) through use of the network link (wireless or wired). Using the network link, server 101 can communicate with data recording devices 102.

The server 101 may include instructions stored in RAM of memory 205, and includes the structural map generator 105, the fingerprint map generator 106, and a recording initiator 225.

To begin with, the server 101 can initiate the recording or gathering of the sensorial data by prompting one or more data recording devices 102, such as mobile phones. For instance, processor 200 uses executable instructions to further trigger executable instructions stored in the data recorder 107 of the data recording device 102 to acquire sensorial data within the area, when the data recording device 102 is in the vicinity of the space or in the space. The space may be inside or in an indoor area of a shopping mall, an airport, a warehouse, a university, or any at least partially enclosed building.

In an example, the recording initiator 225 can trigger the data recording device 102 to automatically begin gathering the sensorial data in the space, based on a location of the data recording device 102 in relation to the space. In said example, the recording initiator 225 can cooperate with, for instance, either a satellite-based navigation system, such as a global positioning system (GPS), or a cellular signal-based locating system or a combination thereof, of the data recording device 102 to determine the location of the data recording device 102. For instance, when the recording initiator 225 discovers, based on inputs from the locating system, that the data recording device 102 is in the indoor area of a venue for which the calibration is to be done, then the recording initiator 225 can initiate the data recording device 102 to passively record sensorial data. In other words, the recording initiator 225 may determine if the data recording device 102 has transitioned from an outdoor are to the indoor area and, accordingly, trigger the data recording device 102 to initiate data recording. As explained, the recording initiator may determine the transition of the data recording device 102 from the outdoor to indoor area based on the location of the data recording device in real-time. Accordingly, as an example, if, based on the location of the data recording device 102, the recording initiator 225 determines that the data recording device has moved from the outdoor area to an indoor area, but of a venue for which the calibration is not to be performed, then the recording initiator 106 may not trigger the data recording device 102 for recording the sensorial data.

In another example, the recording initiator 225 may determine that the data recording device 102 is in the vicinity of the location of interest and, based on an outdoor trajectory of the data recording device 102, determines that the data recording device 102 is about to enter the space, then the data recording device 102 may initiate the data recording. In yet another example, the recording initiator 225 may allow the data recording device 102 to continue to capture the sensorial data as long as the data recording device 102 is inside the space of interest. In said example, as soon as recording initiator 225, based on the location of the data recording device 102, determines that the data recording device 102 has exit the indoor area of the venue and is outside the venue, then the recording initiator 225 may prompt the data recording device 102 to either pause or terminate the data gathering. Once gathered, the sensorial data can be acquired or obtained by the server 101 from the data recording device 102, for instance, over the network 104.

At the server, the structural map generator 105 can use the sensorial data to create a structural map of the space representing various map constraints, such as physical constraints, in the space. Accordingly, according to an aspect, the structural map generator 105 can derive, from the sensorial data, a plurality of trajectories, such as complete trajectories or trajectory segments, which indicate movement of the data recording device 102 in the space. In one example, deriving or estimating the trajectory of the data recording device 102 in accordance with aspects of the present subject matter may involve data fusion that may be based on the wireless signal data, inertial data, barometric data, magnetic data and other device data may include such as, but not limited to, instantaneous inertial sensor measurements including directional heading and step length, short-term inertial sensor measurement history within a specified time window, Wi-Fi received signal strength and connectivity measurements, Bluetooth received signal strength measurements, barometric-based pressure data, magnetic field data including field strength and direction, floor layout map constraints such as doors, walls and entryways, environment landmarks, cellular communication signal strengths, and GPS signal data.

The trajectory derivation may itself be an iterative process and, accordingly, the structural map generator 105 can determine the trajectories using sensorial data and then refine those trajectories for an accurate assessment and correct calibration. For instance, for refining the trajectories, the structural map generator 105 may identify multiple anchor points inside the space. For instance, each anchor point can indicate a site in the space at which either a transition in an elevation inside the space takes place or a transition between the indoor area and an outdoor area takes place. In other words, the anchor points, in said example, can be the site in the indoor space at which either the data recording device enters or exits the space, i.e., it's a doorway to the space, or a site at which the data recording device can transition the floor, in case the venue is a multi-floor building.

In one case, the structural map generator 105 may use the trajectories already derived from the sensorial data or the sensorial data itself to identify the anchor points. Therefore, when the structural map generator 105 determines that the sensorial data, for instance, barometric data, gyroscopic data or accelerometer data, indicates that the data recording device 102 has made a transition in its elevation, the structural map generator 105 can identify that point of transition as an anchor point. Similarly, in another case, when, based on GPS data, the structural map generator 105 determines that at a certain point the data recording device transitions between the outdoor area and the indoor area, the structural map generator 102 can mark that point as an anchor point.

As will be understood, the trajectories and the sensorial data, as explained previously, may be obtained from a single or multiple data recording devices 102 over a period of time. Therefore, for each location or region of the space, multiple different trajectories may be obtained, for instance, due to variations in the sensors from one data recording device 102 to another or due to variations in the sensor readings of the same date recording device 102 at different instances. The present subject matter envisages, amongst other things, to address and eliminate such variations. Accordingly, even with such variations, the structural map generator 105 can, in the manner described above based on the trajectories, estimate a set of concentrated anchor points in vicinity of one or more locations inside the space. Further, the structural map generator 105 cane fuse the concentrated anchor points to estimate a single anchor point at that location inside the space. In one example, the structural map generator 105 may employ a machine-learning based clustering technique, such as k-means clustering technique and the like, for fusing the plurality of concentrated anchor points to estimate the single anchor point at that location.

The identification of a single the anchor point at a given location by the structural map generator 105 is explained with reference to the following example. However, the following example is provided for the purposes of illustration only and is not to be construed as limiting. For instance, at a given location, the structural map generator 105 may identify a general region or location having multiple anchor points in each other's vicinity at which the data recording device changes elevation. In other words, the structural map generator 105 may identify a general region showing a concentration of multiple anchor points which indicate that an escalator, an elevator, or a staircase may be present in that region. Therefore, each trajectory of each data recording device may show a spatially different anchor point that indicates transition, even though all such different anchor points concentrated in this location may pertain to the same physical feature, such as the staircase. In such a scenario, the structural map generator 105 may use machine learning-based techniques for fusing the multiple anchor points and estimating, with a fair accuracy, the single anchor point representing the actual position of the anchor point inside the space.

In certain cases, the structural map generator 105 may identify multiple anchor points in a general region or surrounding a location but all such anchor points may or may not belong to the same actual point of transition or physical map constraint. For instance, in case two physical map constraints, say an elevator and a staircase, which are in close proximity inside the space may cause the structural map generator 105 to conclude from the trajectory or the sensor data that the concentrated anchor points pertain to a single physical map constraint, even though they may pertain to two different types of physical map constraints. In such a case, use of the machine clustering techniques by the structural map generator can, with a fair degree of accuracy, segregate the concentrated anchor points into two different clusters, such that, ultimately, two anchor points are identified at that location pertaining to the two different physical map constraints.

Once the anchor points have been identified with sufficient accuracy, in an example, the structural map generator 105 can refine the trajectories which have been previously determined based on the sensorial data. According to an aspect, for refining the trajectories, the structural map generator 105 can identify a set of relevant trajectories from amongst the previously identified trajectories connecting the anchor points. In one example, the structural map generator 105 is to identify the relevant trajectories by determining a confidence score associated with each trajectory. In said example, the structural map generator 105 may determine the confidence score of each trajectory based on various parameters, such as a theoretical best fit between the anchor points that the trajectory connects, a similarity of the trajectory with a majority proportion amongst the trajectories.

In addition or alternately, the structural map generator 105 may even select the relevant trajectory based on an auxiliary corroborating technique. For instance, the theoretical best fit may include a mathematical technique of determining the trajectory that most appropriately defines the relationship between two or more anchor points and the multiple trajectories connecting them. Further, the similarity of the trajectory with the majority proportion would, for instance, indicate that there are greater number of trajectories which are similar and, therefore, indicate a substantially accurate representation of the path that connects the anchor points. In addition, the auxiliary corroborating technique may include the structural map generator employing signal from at a satellite-based navigation system, such as GPS, and a cellular signal-based locating system. In this case, for instance, even if the structural map generator 105 finds that the trajectory connecting two anchor points is the best fit or is found to substantially conform with the majority, but the location shows that the trajectory is present in an entirely different part of the indoor space, then the structural map generator 105 may not select that trajectory.

Once the trajectories have been identified and refined, the structural map generator 105 can use these refined trajectories to generate the structural map of the space representing various map constraints of the space. As an example, the map constraints can include the physical elements or entities in the space and can be one or more accessible zones in the space, one or more inaccessible zones in the space, a doorway of the space, and points of transition of elevation, i.e., elevators, escalators, or staircase, inside the space. For instance, the structural map generator 105 can identify the accessible zones as a pedestrian area which can be a pathway or an open passageway area, such as a lobby area. The structural map generator 105 can further identify the pathway as narrow pathways or fairly broad passageways, depending on the derived, refined trajectories. Similarly, in said example, structural map generator 105 can identify the non-accessible zones as a wall or a floor opening.

In one example, structural map generator 105 can employ geometry-based zone detection techniques on the trajectories, such as the refined trajectories, to identify the map constraints. In said example, the geometry-based zone detection technique may be based on various general behavioral patterns of users. For instance, users may, as a behavioral trait, generally avoid walking close to walls and obstacles in the indoor space. Accordingly, in a narrow hallway or passageway, or any other constrained spaces, the user may generally walk in the mid-region of the space. Therefore, when the structural map generator 105 identifies such aa trajectory segment, it concludes that such a movement pattern of the user can mean that the portion of the space for which that trajectory segment has been recorded has a high probability of being a narrow passageway. In another example, using the geometry-based zone detection technique, the structural map generator 105 can identify that the convergence of trajectories at a point and divergence from that point may indicate that the point is a doorway connecting two regions in the space.

In another example, in addition to above or as an alternative, the structural map generator 105 may employ the sensorial data to identify the map constraints. For instance, in case the sensorial data from the accelerometer, the gyroscopic sensor, or the barometric sensor, or the combination thereof, indicates that the elevation of the data recording device 102 has changed, then, as a first step, the structural map generator 105 determines that the space includes a map constraint which could be one of an elevator, an escalator, or a staircase. As a second step, the structural map generator 105 may determine a rate of variation of the elevation. For instance, in case the change in elevation is slow and the rate is inconsistent, then the structural map generator 105 may conclude that the map constraint is a staircase. On the other hand, if the rate of change of elevation is relatively fast and regular, then the structural map generator 105 may in addition use the trajectory to identify the map constraint. For instance, if the trajectory is substantially vertical, the structural map generator 105 may conclude that the map constraint is an elevator; otherwise, an escalator.

In addition, the fingerprint map generator 106 can use the sensorial data and extract calibration information associated with a series of locations in the space. The fingerprint map generator 106 may use the extracted calibration information along with the structural map to generate the fingerprint map or the fingerprint repository of the space. For instance, the calibration information can include signature of the sensorial data per location in the space and which can be used to individually identify each location inside the space. In an example, the fingerprint map can indicate variation of sensorial data on the structural map, i.e., in the space, and can be usable for localization or positioning as well as navigation inside the space. In an example, the fingerprint map may be indicative of the discretized distribution of the calibrated spatial data in the space in an indoor area and can be used for localizing devices in the space in an indoor area.

Therefore, as a consequence of the calibration by the server 101, in an example, the server 101 may include a fingerprint repository (not shown in figures), which may be communicatively accessible to mobile devices, via the network 140, for localization. For instance, once the space is calibrated, the various locations or physical entities identified in the space can be georeferenced with any information which can be used to indicate the location of the physical entity in the space. In one example, as part of georeferencing, global or absolute coordinates are used to indicate the location of the physical entities. In other examples, a local coordinate system, for instance, associated with the space in an indoor area, may be used for georeferencing the physical entities. Further, in addition to the fingerprint map being integrated with the georeferences of the various physical entities, the fingerprint map can also be integrated with a spatial indexing model of the space for use for localizing the mobile devices. Upon completion of this association, the fingerprint map in combination with the structural map can be used for localization and providing one or more indoor-location based services based on localization of a mobile device in the space in an indoor area.

In some embodiments, given that sampling times and sampling rates applied in conjunction with particular mobile device sensors may be different, the signal and sensor information as measured during a fingerprint calibration process may be aggregated and fused, for example, time-averaged across particular periods of time, with the aggregated and fused value being used to represent the signal information at any given instance of time within that particular period of time in which the signal information is aggregated and fused.

The terms fingerprint map, fingerprint data, and/or fingerprint repository as used herein refer to time-correlated or time-stamped, individual measurements of any of, or any combination of, received wireless communication signal strength and signal connectivity parameters, magnetic field measurements and barometric pressure measurements, and mobile device inertial sensor data at known, particular locations within an area being traversed, or anticipated for traversal, by the mobile device. In other words, a fingerprint includes a correlation of sensor and signal information including, but not necessarily limited to wireless signal strength, magnetic and barometric data, and inertial sensor information time-correlated for respective positions or coordinate locations within the area or facility being traversed. For instance, barometric fingerprint data associated with contiguous locations or positions may establish a pattern or signature that uniquely correlates to that particular sequence of locations or positions. Once a particular as-measured value, a pattern or signature based on any one or more of received wireless communication signal strength and signal connectivity parameters, magnetic field parameters or barometric pressure parameters, and mobile device inertial sensor data is detected or recorded by the mobile device, the value or pattern as detected may be matched to a reference fingerprint stored in a fingerprint map of a given facility, for example as stored in positioning fingerprint repository, to identify the unique position of the mobile device relative to the facility, a process also referred to herein as localization.

Methodology

Figure 3:
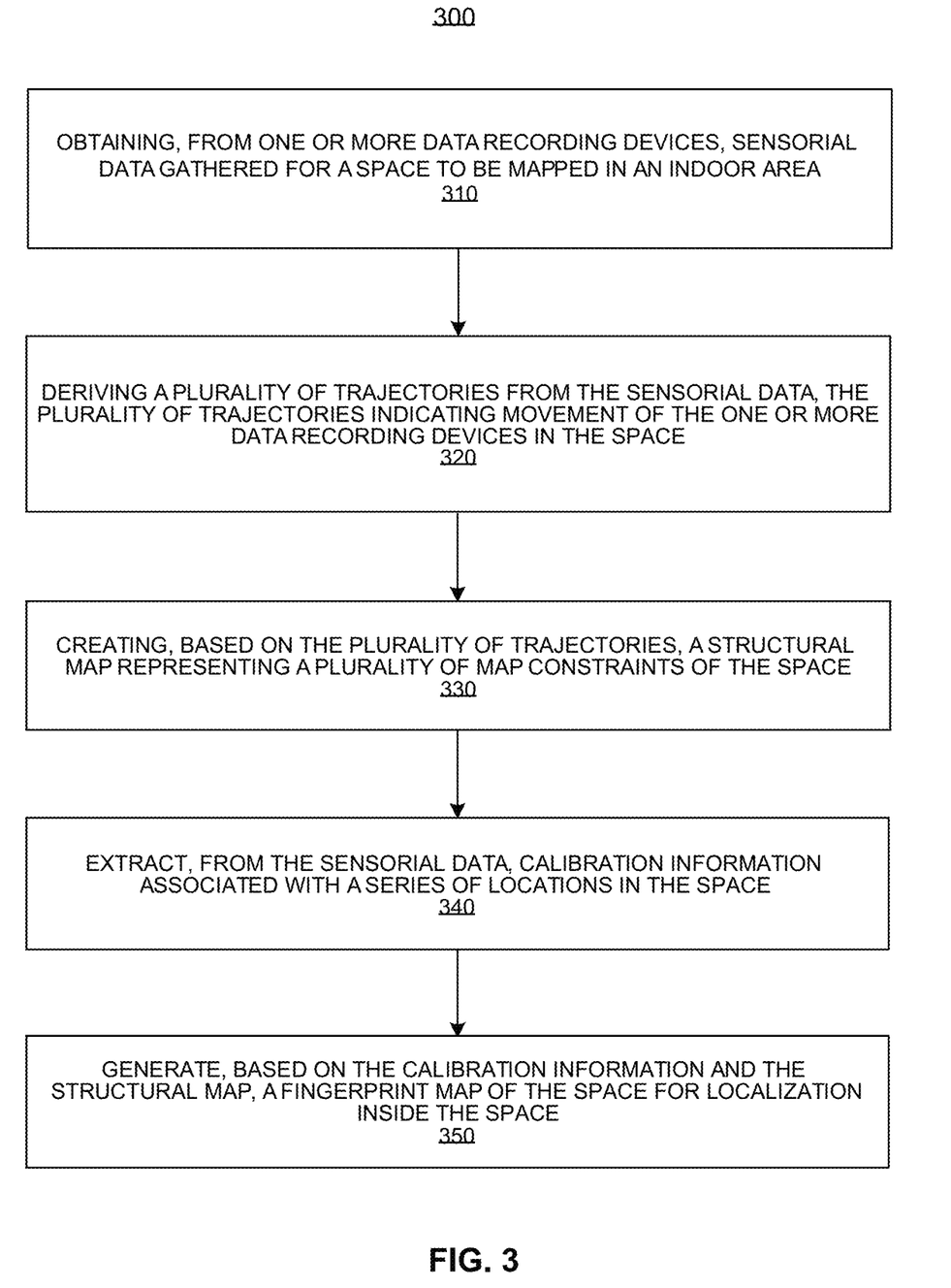
FIG. 3 illustrates, as an example, a method of automated calibration of the space in the indoor area.

FIG. 3 illustrates, as an example, a method 300 of automated calibration of a space in an indoor area. In describing examples of FIG. 3, reference is made to the examples of FIGS. 1-2 for purposes of illustrating suitable components or elements for performing a step or sub-step being described. For the sake of brevity, the detailed operation of the components or elements has not been repeated herein and will be understood to be associated with the respective step or sub-step being described.

It will be appreciated that some of the method steps may be deleted, modified, or more steps may be added. Also, the steps are not limited by the order in which they are performed. Some of the steps may be performed simultaneously as well.

Referring to FIG. 3 examples of method steps described herein are related to a server, such as the server 101, to facilitate automated calibration of the space in the indoor area for localization of mobile devices in such a space. According to one embodiment, the techniques are performed by the processor 200 executing one or more sequences of software logic instructions that constitute the structural map generator 105, the fingerprint generator 106, and the recording initiator 225 of the server 101. In embodiments, structural map generator 105, the fingerprint generator 106, and the recording initiator 225 may include the one or more sequences of instructions within sub-modules. Such instructions may be read into the memory 205 from machine-readable medium, such as memory storage mobile devices. Execution of the sequences of instructions contained in structural map generator 105, the fingerprint generator 106, and the recording initiator 225 in the memory 205 causes the processor 200 to perform the process steps described herein. It is contemplated that, in some implementations, some of the sub-modules, or any other portions of executable instructions constituting structural map generator 105, the fingerprint generator 106, and the recording initiator 225 may be hosted at a remote device other than at the server 101. In alternative implementations, at least some hard-wired circuitry may be used in place of, or in combination with, the software logic instructions to implement examples described herein. Thus, the examples described herein are not limited to any particular combination of hardware circuitry and software instructions.

At block 310, sensorial data gathered by one or more data recording devices 102 in the space to be mapped in the indoor area is obtained, for example, at a server which is to perform the calibration. In an example, the data recording device 102 can be, for instance, a mobile phone or other portable device having a plurality of sensors including inertial sensors and signal sensors. For instance, inertial sensors may include accelerometer, gyroscope, barometer, and other sensors having magnetic field sensing functionality and/or environmental pressure sensing functionality. Similarly, in said example, the signal sensors may include sensors capable of detecting and measuring Bluetooth, Wi-Fi, RFID, and GPS signals.

For gathering the sensorial data, one or more data recording devices 102 are triggered to automatically commence gathering of the sensorial data in the space, based on a location of the data recording device 102 in relation to the space. For instance, when the data recording device 102 is determined to be in the indoor area of a venue for which the calibration is to be done, then the data recording device 102 may be triggered to passively continue to record spatial data as long as the data recording device is inside the space. According to an example, the transition of the data recording device 102 from an outdoor area to the indoor area can be determined using either a satellite-based navigation system, such as a global positioning system (GPS), or a cellular signal-based locating system or a combination thereof, which can determine the location of the data recording device 102 in real-time. In said example, as soon as the data recording device 102 is determined to have exit the indoor area of the venue and is outside the venue, then the data gathering may be paused or terminated altogether. In another example, if the location of the data recording device 102, determined, for instance, based on the GPS, indicates that it has transitioned from outdoor area to indoor area, but of a venue for which the calibration is not to be performed, then the data recording device 102 may not be triggered for recording the spatial or sensorial data.

At block 320, from the gathered sensorial data, a plurality of trajectories, such as complete trajectories or trajectory segments, are derived which indicate movement of the data recording device 102 in the space. In one example, as part of trajectory derivation, the trajectories may be refined for an accurate assessment and correct calibration. Accordingly, for refining the trajectories, multiple anchor points are identified inside the space. In one case, the trajectories already derived from the sensorial data or the sensorial data itself can be used to identify the anchor points. For instance, each anchor point can indicate a site in the space at which either a transition in an elevation inside the space takes place or a transition between the indoor area and an outdoor area takes place. In other words, the anchor points, in said example, can be the site in the indoor space at which either the data recording device 102 enters or exits the space, i.e., it's a doorway to the space, or a site at which the data recording device 102 can transition the floor, in case the venue is a multi-floor building. Therefore, when the sensorial data, for instance, barometric data, gyroscopic data or accelerometer data, indicates that the data recording device 102 has made a transition in its elevation, the point of transition can be identified as an anchor point. Similarly, in another case, when, based on GPS data, the point is determined at which the data recording device 102 transitions between the outdoor area and the indoor area, that point can be considered another anchor point.

Once the anchor points have been identified with sufficient accuracy, the trajectories previously determined based on the sensorial data can be refined. According to an aspect, for refining the trajectories, a set of relevant trajectories connecting the anchor points are identified from amongst the trajectories, previously identified. This set of relevant trajectories, in one example, is selected from amongst the entire collection of trajectories, based on a confidence score of each trajectory. In said example, the confidence score of each trajectory can determined based on various parameters, such as a theoretical best fit between the anchor points that the trajectory connects, a similarity of the trajectory with a majority proportion amongst the trajectories, and may even be selected based on an auxiliary corroborating technique.

At block 330, using the refined trajectories, a structural map of the space can be created which represents various map constraints of the space. As an example, the map constraints can include the physical elements or entities in the space and can be one or more accessible zones in the space, one or more inaccessible zones in the space, a doorway of the space, and points of transition of elevation, i.e., elevators, escalators, or staircase, inside the space. For instance, the accessible zones can be identified as a pedestrian area and can be a pathway or an open passageway area, such as a lobby area. Further, the pathway can be identified as narrow pathways or fairly broad passageways, depending on the derived trajectories. Similarly, in said example, the non-accessible zones can be identified as a wall or a floor opening.

In one example, geometry-based zone detection techniques can be applied on the trajectories to identify the map constraints based on the trajectories. In said example, the geometry-based zone detection technique may be based on various general behavioral patterns of users. In another example, the geometry-based zone detection technique can identify that the convergence of trajectories at a point and divergence from that point may indicate that the point is a doorway connecting two regions in the space. In yet another example, in addition to above or as an alternative, sensorial data may be used to identify the map constraints. For instance, in case the sensorial data from the accelerometer, the gyroscopic sensor, or the barometric sensor, or the combination thereof, indicates that the elevation of the data recording device 102 has changed, it may be concluded the space includes a map constraint which could be one of an elevator, an escalator, or a staircase. Further, in case the change in elevation is slow and the rate is inconsistent, then it may be concluded that the map constraint is a staircase. On the other hand, if the rate of change of elevation is relatively fast and regular, then the trajectory may be used to identify the map constraint. For instance, if the trajectory is substantially vertical, then it may be concluded that the map constraint is an elevator.

At block 340, the sensorial data can be used to extract calibration information associated with a series of locations in the space. For instance, the calibration information can include signature of the sensorial data per location in the space and which can be used to individually identify each location inside the space.

At block 350, the extracted calibration information can be used along with the structural map to generate the fingerprint map or the fingerprint repository of the space. In an example, the fingerprint map can indicate variation of sensorial data on the structural map, i.e., in the space, and can be usable for localization or positioning as well as navigation inside the space. In an example, the fingerprint map may be indicative of the discretized distribution of the calibrated spatial data in the space in an indoor area and can be used for localizing devices in the space in an indoor area.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A server computing device for generating a fingerprint map for an indoor area, where layout of the indoor area is previously unknown, the server computing device comprising:
   a processor; and
   a memory storing a set of instructions, the instructions executable in the processor to:
   obtain, from one or more data recording devices, sensorial data gathered for a space to be mapped in the indoor area;
   derive a plurality of trajectories from the sensorial data, the plurality of trajectories indicating movement of the one or more data recording devices in the space;
   estimate a plurality of map constraints of the space by applying geometry-based zone detection technique on the plurality of trajectories, the plurality of map constraints including at least a non-accessible zone;
   create, based on the plurality of trajectories and the plurality of map constraints, a structural map representing the space;
   extract, from the sensorial data, calibration information associated with a series of locations in the space; and
   generate, based on the calibration information and the structural map, a fingerprint map of the space for localization inside the space.

2. The server computing device of claim 1 further comprising instructions to trigger each of the one or more data recording devices to automatically commence gathering of the sensorial data in the space, based on a location of each of the one or more data recording devices in relation to the space.

3. The server computing device of claim 2, wherein the sensorial data comprises at least one of data from inertial sensors and data from signal sensors of each of the one or more data recording devices.

4. The server computing device of claim 1, wherein the plurality of map constraints of the space comprise at least one of accessible zones in the space, a doorway of the space, and points of transition of elevation inside the space.

5. The server computing device of claim 4, wherein the accessible zones comprise a pedestrian area and one of a pathway and an open passageway area, and the non-accessible zones comprise one of a wall and a floor opening.

6. The server computing device of claim 1 further comprising instructions executable in the processor to:
   estimate, based on the plurality of trajectories, a plurality of anchor points inside the space, each of the plurality of anchor points indicating one of a site of transition in an elevation inside the space and a site of transition between the indoor area and an outdoor area; and
   select a set of relevant trajectories from amongst the plurality of trajectories connecting the plurality of anchor points inside the space, the set of relevant trajectories being selected based on a confidence score of each trajectory connecting the plurality of anchor points.

7. The server computing device of claim 6, wherein the confidence score of each trajectory is determined based on at least one of: a theoretical best fit between the anchor points, a similarity of the trajectory with a majority proportion amongst the plurality of trajectories, and an auxiliary corroborating technique.

8. The server computing device of claim 7, wherein the auxiliary corroborating technique comprises employing signal from at least one of a satellite-based navigation system and a cellular signal-based locating system.

9. The server computing device of claim 1 further comprising instructions executable in the processor to:
   estimate, based on the plurality of trajectories, a plurality of concentrated anchor points in vicinity of at least one location inside the space; and
   fuse the plurality of concentrated anchor points to estimate an anchor point at the at least one location inside the space, wherein the anchor point is indicative of one of a site of transition in an elevation inside the space and a site of transition between the indoor area and an outdoor area.

10. The server computing device of claim 9 further comprising instructions executable in the processor to fuse the plurality of concentrated anchor points to estimate the anchor point using a machine-learning based clustering technique.

11. A method for generating a fingerprint map for an indoor area, where layout of the indoor area is previously unknown, the method comprising:
   obtaining, from one or more data recording devices, sensorial data gathered for a space to be mapped in an indoor area;
   deriving a plurality of trajectories from the sensorial data, the plurality of trajectories indicating movement of the one or more data recording devices in the space;
   estimating a plurality of map constraints of the space by applying geometry-based zone detection technique on the plurality of trajectories, the plurality of map constraints including at least a non-accessible zone;
   creating, based on the plurality of trajectories and the plurality of map constraints, a structural map representing the space;
   extracting, from the sensorial data, calibration information associated with a series of locations in the space; and
   generating, based on the calibration information and the structural map, a fingerprint map of the space for localization inside the space.

12. The method of claim 11, wherein the obtaining the plurality of trajectories comprises triggering each of the one or more data recording devices to automatically commence gathering of the sensorial data in the space, based on a location of each of the one or more data recording devices in relation to the space, the sensorial data comprising at least one of data from inertial sensors and data from signal sensors of each of the one or more data recording devices.

13. The method of claim 12, wherein the triggering comprises determine a transition of the one or more data recording device from an outdoor area to the indoor area using at least one of a satellite-based navigation system and a cellular signal-based locating system.

14. The method of claim 11, wherein the plurality of map constraints of the space comprise at least one of accessible zones in the space, a doorway of the space, and points of transition of elevation inside the space.

15. The method of claim 14, wherein the accessible zones comprises a pedestrian area and one of a pathway and an open passageway area, and the non-accessible zones comprises one of a wall and a floor opening.

16. The method of claim 11, wherein the deriving comprises:
estimating, based on the plurality of trajectories, a plurality of anchor points inside the space, each of the plurality of indicating a site of one of a transition in an elevation inside the space and a transition between the indoor area and an outdoor area; and
refining trajectories by selecting a set of relevant trajectories from amongst the plurality of trajectories connecting the plurality of anchor points inside the space, the set of relevant trajectories being selected based on a confidence score of each trajectory connecting the plurality of anchor points.

17. The method of claim 16, wherein the confidence score of each trajectory is determined based on at least one of: a theoretical best fit between the anchor points, a similarity of the trajectory with a majority proportion amongst the plurality of trajectories, and an auxiliary corroborating technique.

18. The method of claim 17, wherein the auxiliary corroborating technique comprises employing signal from at least one of a satellite-based navigation system and a cellular signal-based locating system.

19. The method of claim 11 wherein the deriving comprises:
estimating, based on the plurality of trajectories, a plurality of concentrated anchor points in vicinity of at least one location inside the space; and
fusing the plurality of concentrated anchor points to estimate an anchor point at the at least one location inside the space, wherein the anchor point is indicative of one of a site of transition in an elevation inside the space and a site of transition between the indoor area and an outdoor area.

20. The method of claim 19, wherein the fusing the plurality of concentrated anchor points to estimate the anchor point is performed using a machine-learning based clustering technique.

* * * * *